United States Patent
Fabjanski (10) Patent No.: US 12,490,100 B2
(45) Date of Patent: Dec. 2, 2025

(54) DEVICE PROVISIONING OF AUTHENTICATION CAPABILITY

(71) Applicant: ASSA ABLOY AB, Stockholm (SE)

(72) Inventor: Krzysztof Grzegorz Fabjanski, Bielsko-Biala (PL)

(73) Assignee: ASSA ABLOY AB, Stockholm (SE)

( * ) Notice: Subject to any disclaimer, the term of this patent is extended or adjusted under 35 U.S.C. 154(b) by 123 days.

(21) Appl. No.: 18/261,580

(22) PCT Filed: Jan. 15, 2021

(86) PCT No.: PCT/EP2021/050811
§ 371 (c)(1),
(2) Date: Jul. 14, 2023

(87) PCT Pub. No.: WO2022/152390
PCT Pub. Date: Jul. 21, 2022

(65) Prior Publication Data
US 2024/0080672 A1 Mar. 7, 2024

(51) Int. Cl.
*G06F 7/04* (2006.01)
*G06F 15/16* (2006.01)
(Continued)

(52) U.S. Cl.
CPC .......... *H04W 12/50* (2021.01); *H04W 12/06* (2013.01); *H04W 12/08* (2013.01); *H04W 12/43* (2021.01)

(58) Field of Classification Search
CPC ...... H04W 12/50; H04W 12/43; H04W 12/08
(Continued)

(56) References Cited

U.S. PATENT DOCUMENTS

2015/0121495 A1* 4/2015 Gao .................. H04W 12/04
                                                                726/6
2016/0182499 A1* 6/2016 Sharaga ............... G06F 21/82
                                                                713/156
(Continued)

FOREIGN PATENT DOCUMENTS

EP      3592014        1/2020
WO    2022152390    7/2022

OTHER PUBLICATIONS

"European Application Serial No. 21700749.1, Response Filed Jan. 25, 2024 to Communication pursuant to Rules 161(1) and 162 EPC mailed Aug. 23, 2023", 16 pages.
(Continued)

*Primary Examiner* — Jeffrey C Pwu
*Assistant Examiner* — Samuel Ambaye
(74) *Attorney, Agent, or Firm* — Schwegman Lundberg & Woessner, P.A.

(57) ABSTRACT

A method of provisioning an authentication device of an authentication system comprises sending an authentication application from an authentication system backend server to a backend network of a cellular network operator; verifying, by the backend network of the cellular operator, the authentication application and including the authentication application in an operator profile; sending the authentication application with the operator profile from the backend network of the cellular network operator to a local profile assistant (LPA) of the authentication device; and installing the authentication application in a secure zone of the authentication device using the LPA.

14 Claims, 9 Drawing Sheets

(51) Int. Cl.
    *H04L 29/06*     (2006.01)
    *H04W 12/06*     (2021.01)
    *H04W 12/08*     (2021.01)
    *H04W 12/43*     (2021.01)
    *H04W 12/50*     (2021.01)

(58) Field of Classification Search
    USPC ............................................................ 726/4
    See application file for complete search history.

(56) References Cited

U.S. PATENT DOCUMENTS

2017/0142121 A1*   5/2017   Lee ..................... H04L 63/0853
2020/0045544 A1*   2/2020   Yu ......................... H04W 12/35

OTHER PUBLICATIONS

"International Application Serial No. PCT EP2021 050811, International Search Report mailed Sep. 29, 2021", 4 pgs.
"International Application Serial No. PCT EP2021 050811, Written Opinion mailed Sep. 29, 2021", 6 pgs.
"European Application Serial No. 21700749.1, Communication Pursuant to Article 94(3) EPC mailed May 14, 2025", 4 pgs.
"European Application Serial No. 21700749.1, Response filed Aug. 12, 2025 to Communication Pursuant to Article 94(3) EPC mailed May 14, 2025", 43 pgs.

* cited by examiner

DEVICE PROVISIONING OF AUTHENTICATION CAPABILITY

PRIORITY APPLICATION

This application is a U.S. National Stage filing under 35 U.S.C. § 371 of PCT Patent Application No. PCT/EP2021/050811, filed on Jan. 15, 2021, the disclosure of which is incorporated by reference herein in its entirety.

TECHNICAL FIELD

Embodiments illustrated and described herein generally relate to automatic identity authentication systems that authenticate users for access to secure resources, and to techniques of secure messaging for identity authentication systems.

BACKGROUND

There are many applications for automatic authentication of identity of a person using devices. One example is for automatic access to secured areas. Another example is to prove identity for automatic access to logical asset, such as a financial resource for example. Automatic authentication using devices can involve authentication information being exchanged between a verifier device performing authentication and a credential device such as a smart card or a mobile phone. Automatic authentication can also be machine-to-machine (M2M) in which one device authenticates another device before changing its behavior based on information received from the other device. Devices need one or both of hardware and software configured to perform the functions of authentication. To provide security the devices are often manually so configured, but this is costly for large authentication systems. It would be desirable to use secure messaging to be able to transfer sensitive information to configure devices for use in automatic authentication.

DETAILED DESCRIPTION

Automatic device authentication involves sending sensitive information between devices to prove identity of the holder of a device, or to prove that information is originating from, or being provided to, an authorized device. Devices need one or more of hardware, firmware and software for the logic needed to perform the functions of automatic authentication. To provide security, the devices could be provisioned with this logic manually or using a secured network of the implementer of the system, but more and more it is desired to use devices that are mobile computing devices (e.g., mobile phones or smart cards).

Figure 1:
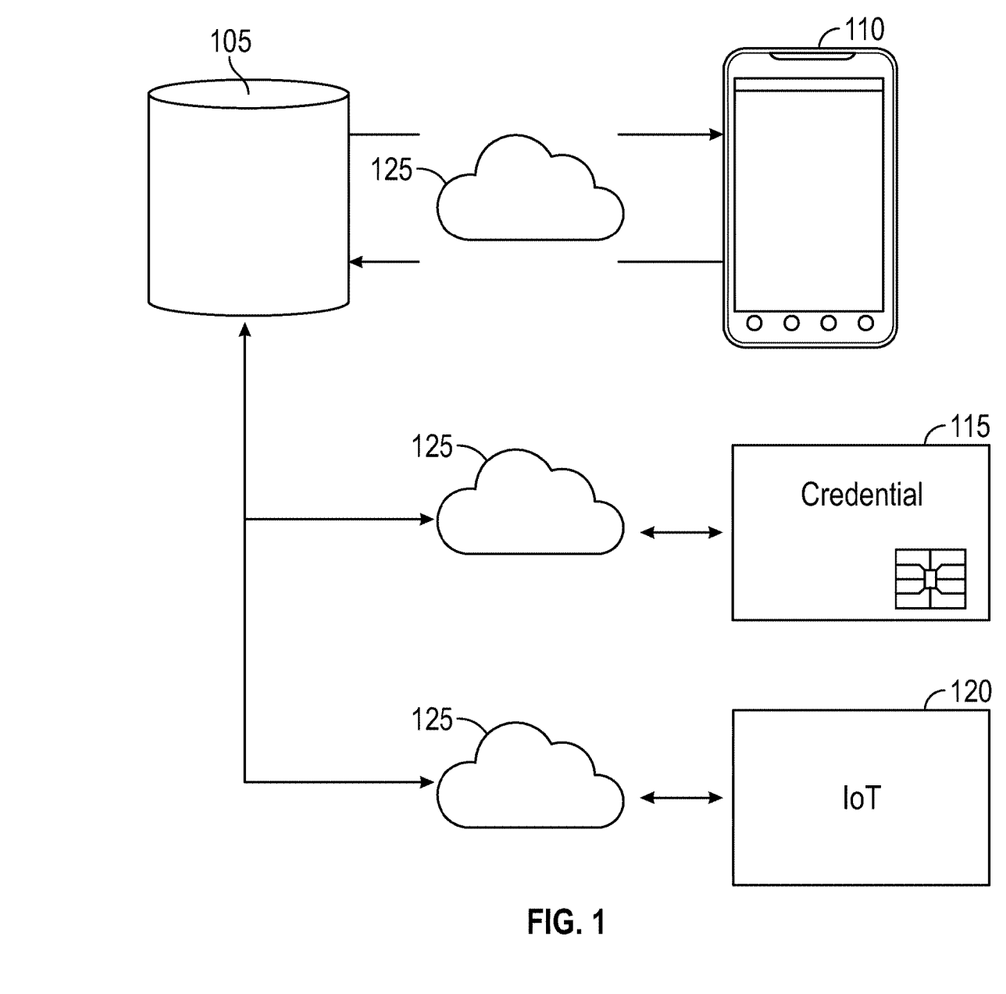
FIG. 1 is an illustration of an example of portions of an authentication system.

FIG. 1 is an illustration of an example of a backend server 105 of an authentication system, a mobile device 110, a credential device 115, and an Internet of Things (IoT) device 120. The mobile device 110 can be a smartphone, a tablet computer, laptop, or any portable computing device. The credential device 115 can be a smartcard or a wearable device used to authenticate the holder of the device. The IoT device 120 can be a M2M industrial device, a smart sensor, smart meter, smart tag, smart lock, or other device with a cellular module or network module.

It would be desirable to transfer sensitive information over a standard wireless communication network 125 to remotely provision devices with the capability for automatic authentication. This sensitive information would include an authentication software application (e.g., a secure operating system core) or applet that would allow a device configured with the authentication application to perform functions related to, among other things, one or more of mutual authentication, credential verification, encryption key management, and secure messaging.

For example, if the end authentication device is a credential device 115, the authentication application may be installed in the credential device 115 with a credential profile that includes digital credentials. Executing the installed authentication application causes the credential device to provide credential information included in the credential profile to a verifier device of the authentication system.

The authentication application protects access to digital credentials stored in the device using cryptographically strong authentication. The authentication application stores digital credentials in application dedicated files (ADFs) that each have a unique object identifier (OID). The ADFs can be created and destroyed dynamically by the authentication application, optimizing use of the available memory over the lifetime of a digital credential.

Each digital credential is protected through selection and authentication. If the end authentication device is a mobile device 110, installing and executing the authentication application in the mobile device 110 causes the mobile device to operate as a verifier device and receive access credential information from a credential device and authenticate the credential device according to access credential information. Additionally, executing the authentication application can also cause the mobile device to operate as a credential device. The authentication application may also be remotely provisioned to a static verifier device such as a reader device of physical access system.

If the end authentication device is an IoT device 120, installing and executing the authentication application in the IoT device 110 causes the IoT device 110 to provide credential information to another device (e.g., a verifier device, or another IoT device) or to receive access credential information from another IoT device and authenticate the other IoT device according to access credential information.

Protection of the credential information or other sensitive information can involve using multiple encryption keys generated using the authentication application. The authentication application may also generate and authenticate static passwords or one-time passwords. The authentication application can be loaded into a secure memory area of the end authentication device where it executes. This secure zone can be a secure element (SE) or secure enclave of the authentication device. The SE may include a secure processor or coprocessor that includes a key manager. Communication between the SE and the processing circuitry of the authentication device is tightly controlled, such as by isolating the communication to an interrupt driven mailbox for example. In certain examples, the secure zone is included in a trusted execution environment (TEE) of the authentication device. The TEE is an execution space for the authentication application that provides a higher level of security than a rich operating system, but offers more functionality than an SE. An example of a TEE is a dedicated secure area of a processor or central processing unit (CPU) of the processing circuitry of the authentication device.

Figure 2:
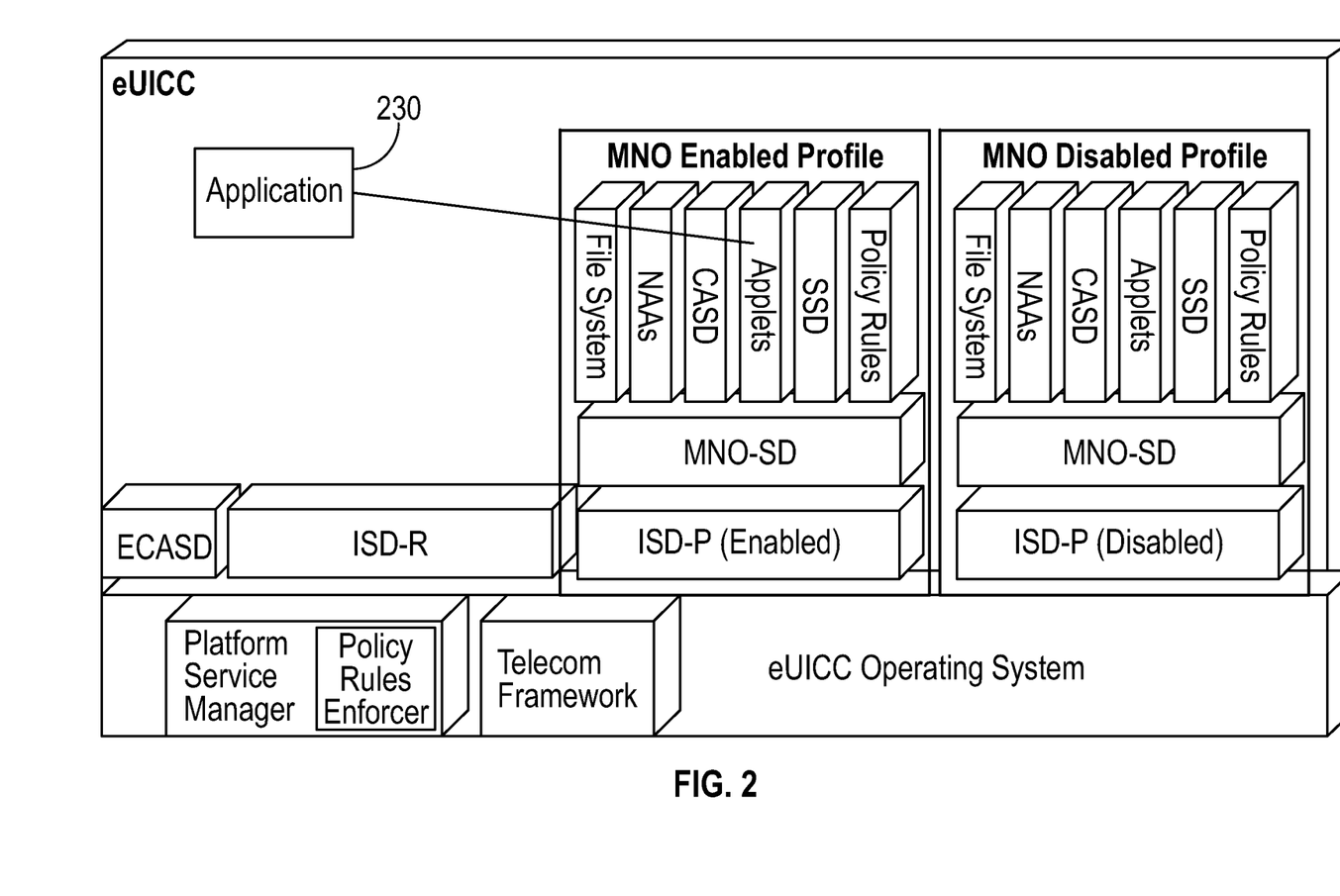
FIG. 2 is a block diagram showing an embedded universal integrated circuit card (eUICC) for an end authentication device.

FIG. 2 is a block diagram showing an embedded universal integrated circuit card (eUICC) for an end authentication device such as any of the mobile device, credential device, or IoT device of the example of FIG. 1. The eUICC is hardware that securely stores the embedded subscriber identity module (eSIM) profile of the device. The eSIM profile is a virtual profile that includes the subscription and network settings that allow the user device to connect to the operator network. The remote provisioning may install the authentication application 230 within the eUICC where it executes to perform the authentication functions. The authentication application 230 is software-based and is independent of the underlying hardware chip to provide a flexible form factor for provisioning the mobile devices, credential devices, and IoT devices of the example of FIG. 1 to perform device authentication, credential presentation, encryption key management, and secure messaging.

A challenge with this technique of remote provisioning of devices is that there are not a lot of options for establishing a secure channel to send the authentication application from the backend server authentication system for provisioning and encoding the devices. The provisioning process should be secure and standardized, and the implementer of the authentication system should maintain control over the Issuer Security Domain (ISD) keys. This level of security cannot be guaranteed if the system implementer does not control all of the devices needed to provision the authentication devices in the system.

Cellular network operators are able to provision subscriber identity module (SIM) cards with profile information over the air using the cellular network using subscription management elements of the operator's backend network. This network can provide a channel to send the authentication application to devices so that the application can be installed to provision the devices for authentication and credentialing functions.

Figure 3:
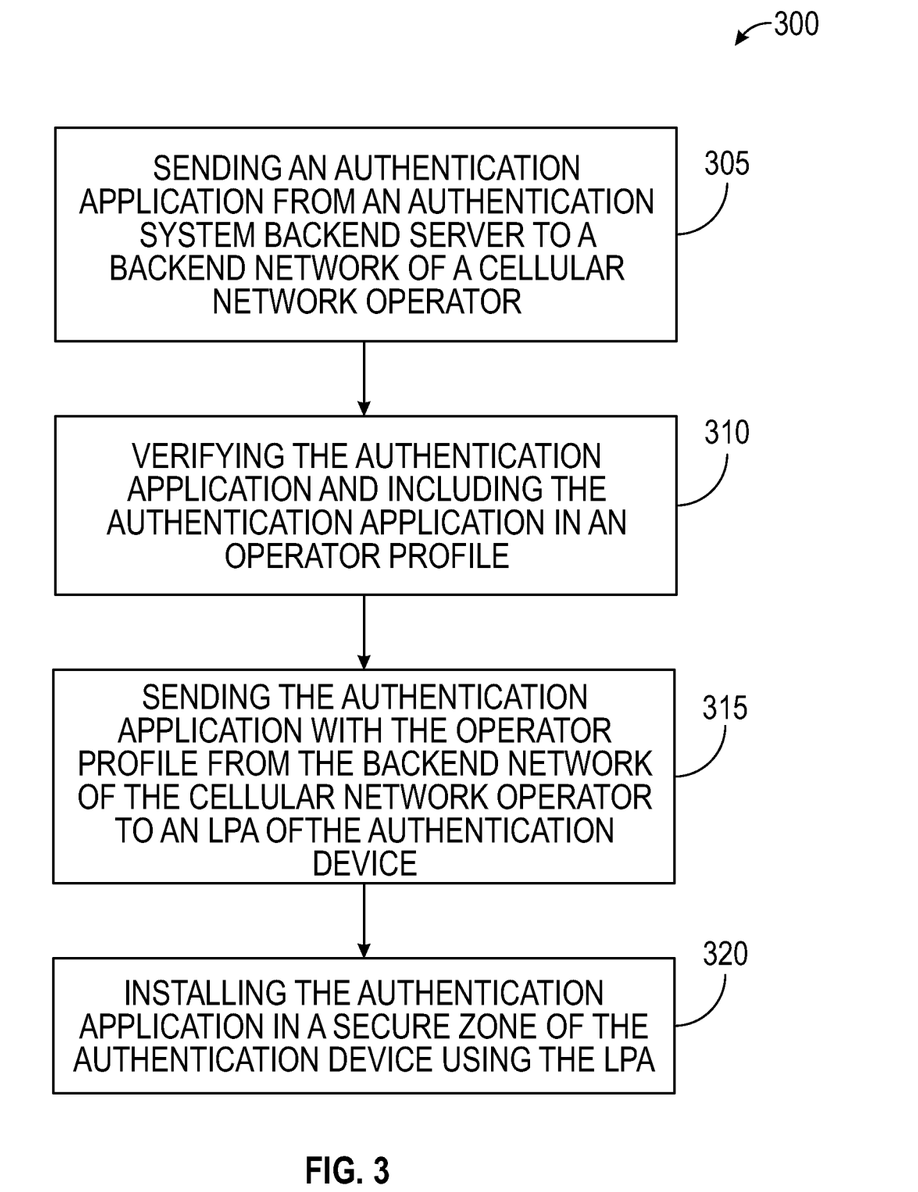
FIG. 3 is a flow diagram of an example of a method of encoding a credential device of an authentication system.

FIG. 3 is a flow diagram of a general method of provisioning an authentication device of an authentication system. At 305, the authentication application from an authentication system backend server is sent to a backend network of a cellular network operator. At block 310, the backend network of the cellular operator verifies the authentication application and includes the authentication application in an operator profile for the end device that will be provisioned as an authentication device (e.g., any of the mobile device 110, credential device 115, or IoT device 120 of FIG. 1). The provisioning of the authentication application may use the subscription manager discovery service (SM-DS) of the network operator.

At block 315, the authentication application is sent with the operator profile from the backend network of the cellular network operator to a local profile assistant (LPA) of the authentication device. At 320, the authentication application is installed in a secure zone of the authentication device using the LPA.

Figure 4:
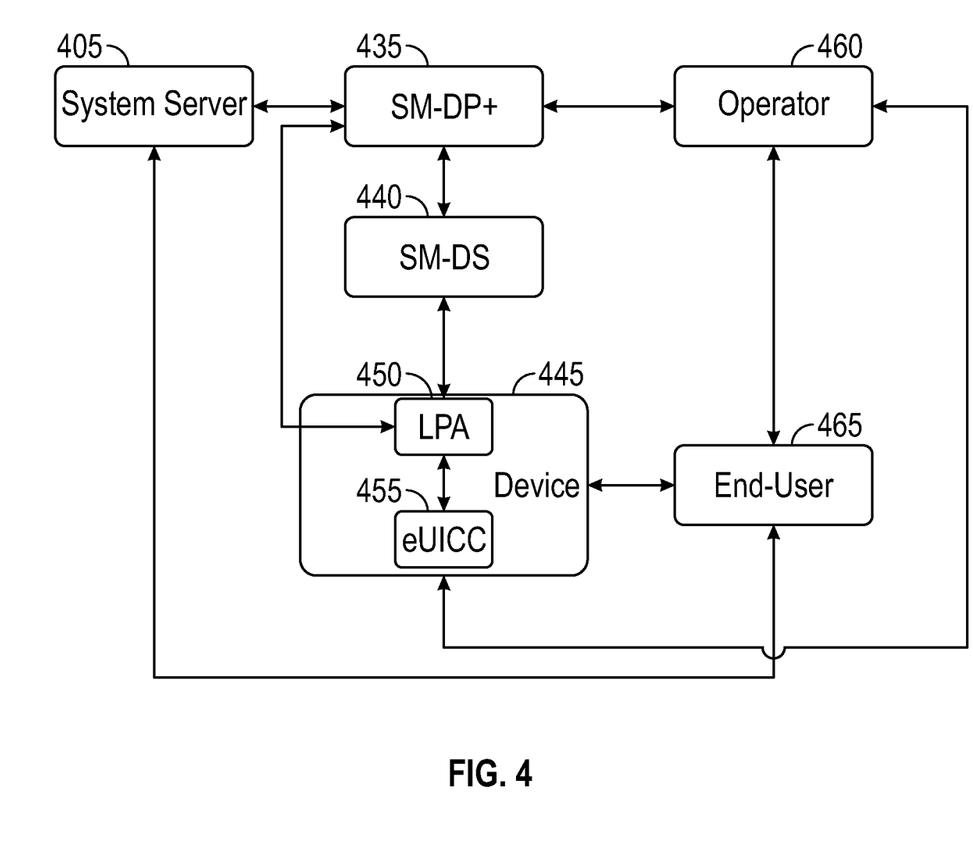
FIG. 4 shows an example of the flow of the authentication application among elements of an authentication system and a network operator backend.

FIG. 4 shows an example of the flow of the authentication application among elements of an authentication system and a network operator backend. In some examples, the end user of the authentication device 465 enables the provisioning. The flow is organized around four of the elements: the subscription manager data preparation (SM-DP) 435, the subscription manager discovery service (SM-DS) 440, the LPA 450 of the authentication device, and the eUICC 455 of the authentication device.

The SM-DP 435 is responsible for the creation, download, remote management (e.g., enable, disable, update, delete) of operator credentials (e.g., the operator profile), and the protection of the operator credentials. The SM-DS 440 is responsible for delivering operator profiles to the LPA 450 of the device. The flow in FIG. 4 includes communication between the backend server 405 of the authentication system and the SM-DP/SM-SR. The SM-DP may encapsulate the functions of both the SM-DP and the SM-SR, and such an SM-DP is designated as SM-DP+. The SM-DP is responsible for secure storage of embedded subscriber identity module (eSIM) profiles, eSIM profile subscriptions, eSIM profile personalization with required subscription data, and eSIM profile preparation for secure download and installation onto the eUICC.

The SM-SR (incorporated into SM-DP+) is responsible for the establishment of a secure channel to each individual eUICC registered to the SM-SR, which later allows for passing remote management operations of download/install, enable, disable, delete, and other functions directly to the eUICC or eSIM profiles. The SM-DP and SM-SR responsibilities are covered in a single platform. Integration of the two functions lowers the complexity and shortens the implementation time. On the other hand, integration of the two functions results in a fixed dependency between the eSIM profile owner (the network operator 460) and the eUICC owner (the service provider).

The LPA 450 is a set of functions in the authentication device 445 responsible for providing the capability to download encrypted profiles to the eUICC 455. The LPA 450 also presents the local management end user interface to the end user 465 so the status of profiles on the eUICC can be managed. The principal functions of the LPA may also be in built into the eUICC.

For a consumer device, the eUICC 455 serves the same high-level purpose as the eUICC of an M2M device, but the implementation may be different to support the end user interaction within a consumer device. The SM-DS 440 provides a means for data (e.g., an operator profile) from an SM-DP to reach the eUICC without the eUICC having to know to which network the device is connected. This feature is important as devices can be connected using different access networks with different addresses. The SM-DS 440 overcomes this by allowing the SM-DP to post alerts to a secure noticeboard and for devices to extract those alerts. The secure noticeboard is used to notify the LPA when profile data is available for download to the eUICC. Notifications are sent from the SM-DP to the SM-DS. The device LPA 450 polls the SM-DS 440 for notifications when desired or required (supporting a "pull" model). Polling frequency may be determined by one or both of the eUICC state and end user actions. In a push model, the SM-DS 440 notifies the LPA 450 when a profile is available to send to the eUICC 455.

Figure 5:
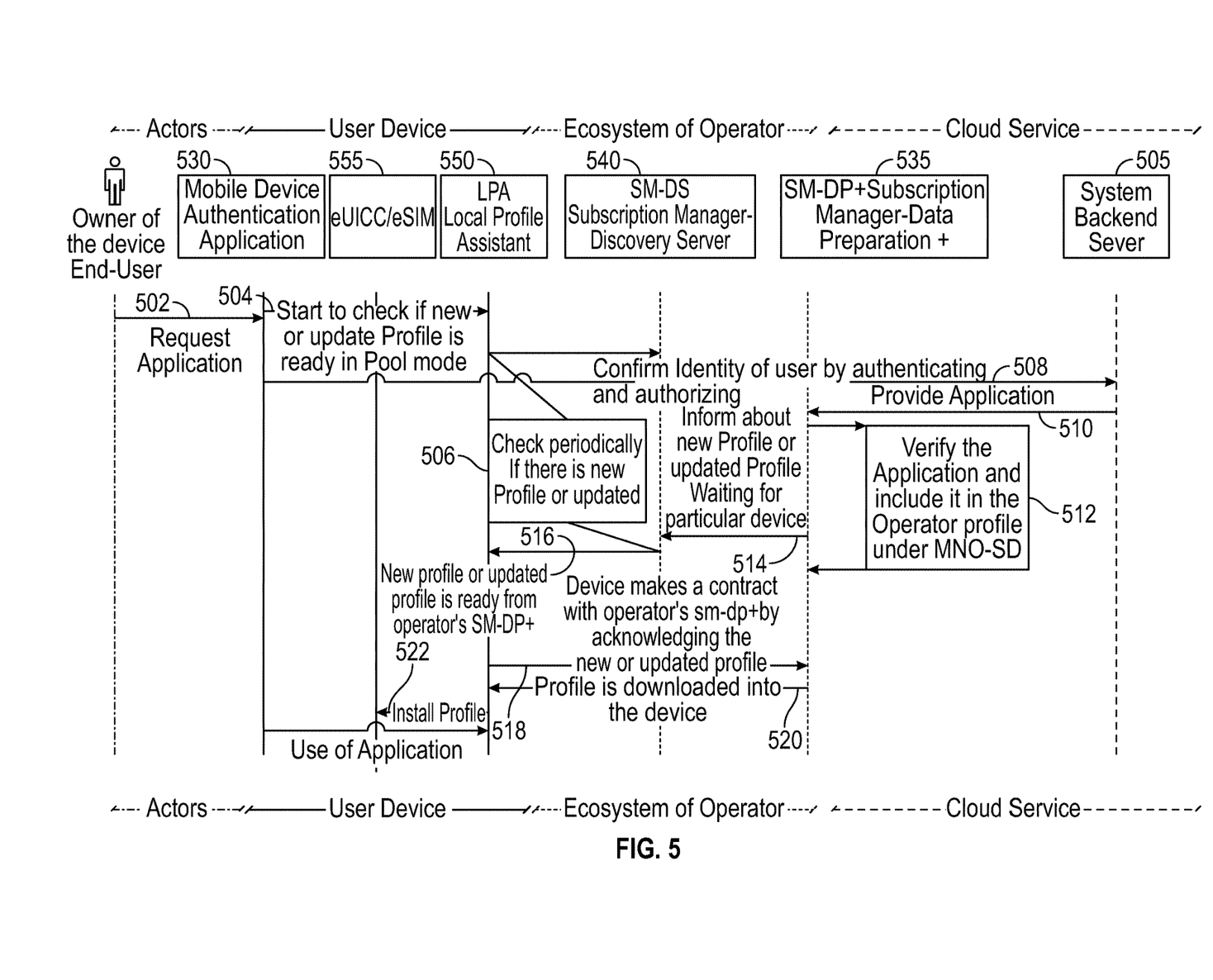
FIG. 5 is a flow diagram of an example of communication among devices of an authentication system.

FIG. 5 is a detailed flow diagram of an example of communication among elements of an authentication system and the network operator backend of FIG. 4. The communication installs an authentication application 530 into a user device (e.g., the mobile device 110 or the credential device 115 in FIG. 1) that includes an LPA 550 and eUICC 555 or eSIM. At step 502, the owner of the device sends a request for the authentication application 530. At step 504, the user device checks if there is a new profile available from the network operator. The profile may contain a new or updated authentication application. Box 506 shows that the user device LPA 550 may poll the SM-DS 540 to see if a profile update is available. If a profile is not available at the SM-DS 540, the backend server 505 confirms the identity of the user at step 508. At step 510, if the identity is confirmed, provisioning the authentication application is authorized and the authentication application is sent from the backend server 505 to the SM-DP+ 535. The example of FIG. 5 shows that the communications with the backend server may be via a cloud service.

Box 512 shows that the SM-DP+ 535 may verify the authentication application and include it in the operator profile under the Mobile Network Operator Security Domain (MNO-SD). At step 514, the SM-DP+ informs the SM-DS 540 of the new or updated operator profile, and at step 516 the SM-DS 540 informs the LPA 550 of the user device that the profile is available. At step 518, the LPA 550 acknowledges the operator profile. This may result in a contract between the LPA 550 of the user device and the operator's SM-DP+ 535. At step 520, the profile containing the authentication application is downloaded from the SM-DP+ 535 to the LPA 550. At step 522, the LPA 550 installs the profile and authentication application 530 into the eUICC or eSIM 555 of the user device (as shown in the example of FIG. 2) and the authentication application 530 is available for use by the user device.

Figure 6:
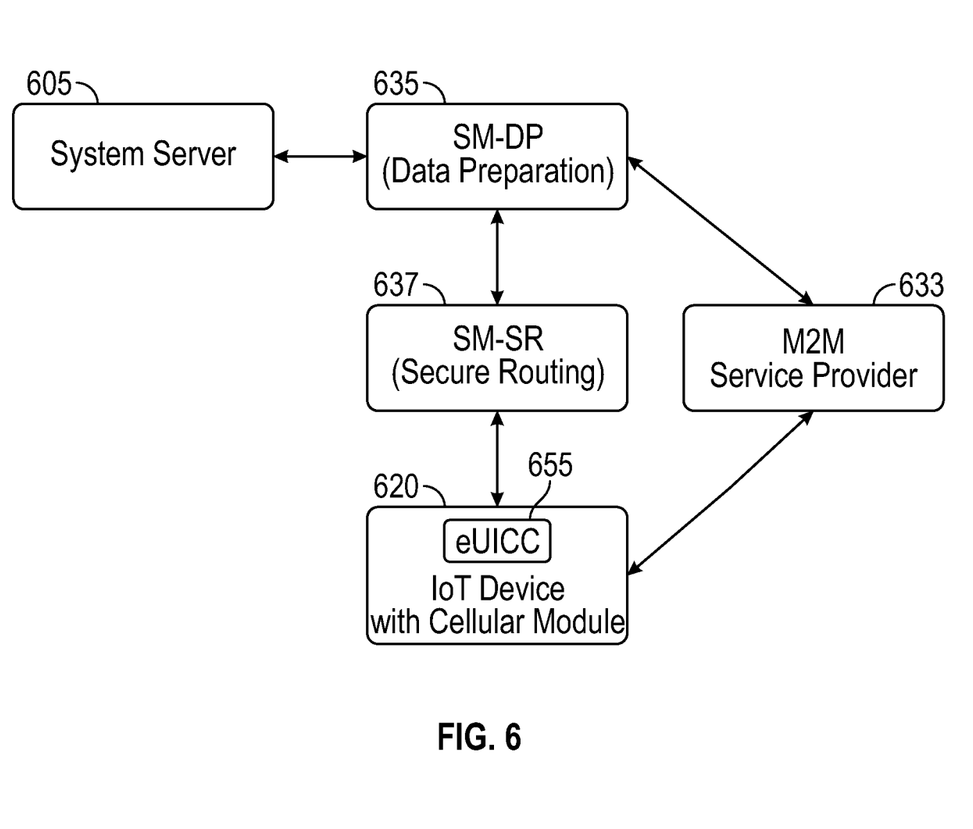
FIG. 6 shows another example of the flow of the authentication application among elements of an authentication system.

FIG. 6 shows another example of the flow of the authentication application among elements of an authentication system. This example is for provisioning an IoT device as an authentication device. The flow is organized around the SM-DP 635, the SM-SR 637, and the eUICC 655 of the IoT device. In contrast to the example of FIG. 4, the SM-DP 635 and SM-SR 637 of the service provider 633 are shown in separate platforms. The provisioning is pushed by a backend server 605 of the authentication system (e.g., the backend server 105 of FIG. 1).

Figure 7:
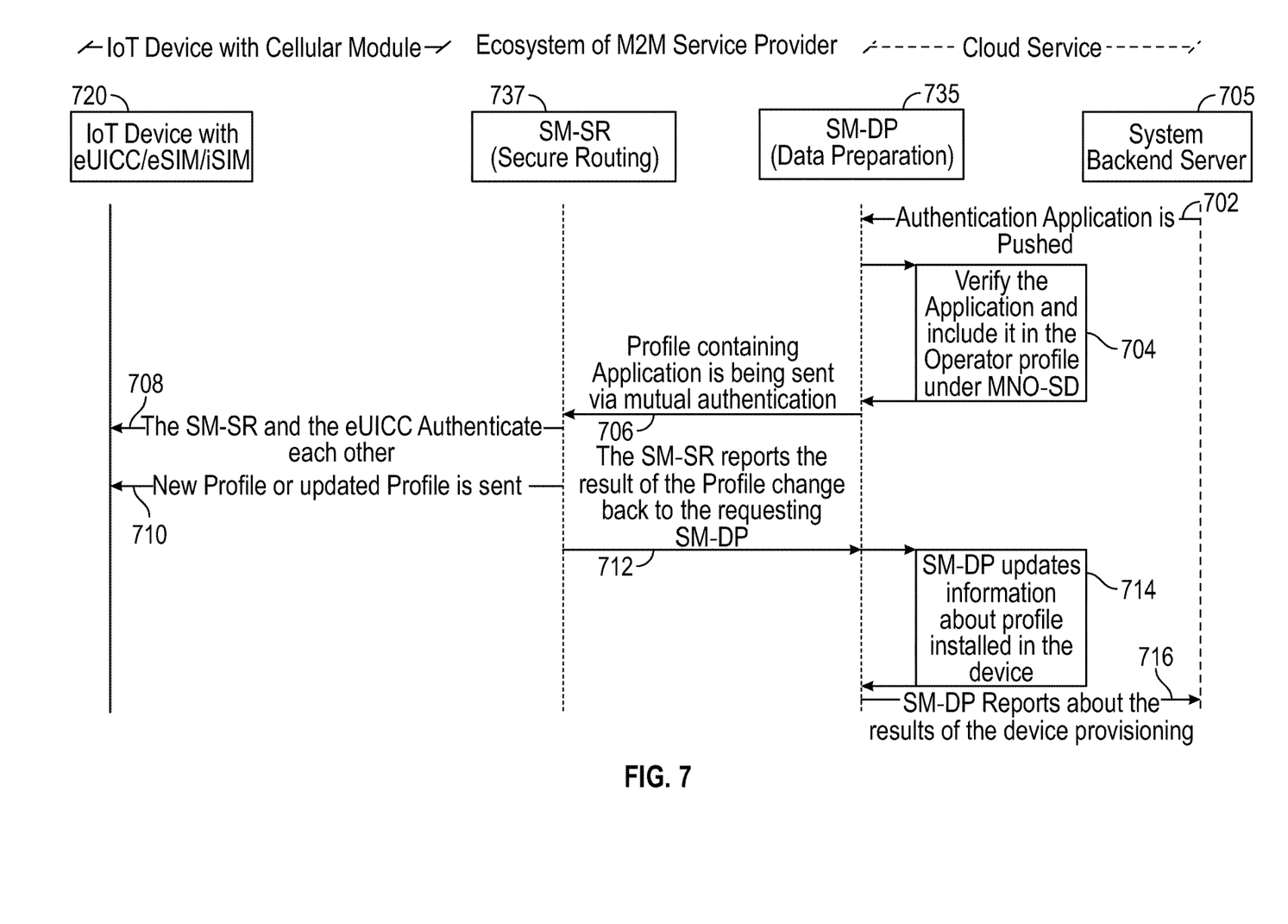
FIG. 7 is a flow diagram of another example of communication among devices of an authentication system.

FIG. 7 is a detailed flow diagram of an example of communication among the elements of the authentication system in FIG. 6. The communication installs an authentication application into a IoT device 720 that has a cellular module. At step 702, the authentication application is pushed to an SM-DP 735 server by a backend server 705 of the authentication system (e.g., the backend server 105 of FIG. 1). At block 704, the SM-DP server 735 verifies the authentication application and includes it in the operator profile under the MNO-SD. At step 706, the authentication application is sent from the SM-DP server 735 to the SM-SR server 737 with the operator profile.

At step 708, the SM-SR server 735 and the eUICC of the IoT device 720 authenticate each other if not already authenticated. The mutual authentication may use a keyset included in the Issuer Security Domain Root (ISD-R). At step 710, the new profile with the new authentication application is installed in the IoT device 720. As shown in the example of FIG. 4, the IoT device 720 may receive the authentication application using the LPA of the IoT device and the LPA 750 may receive the authentication application from an SM-DS as in the example of FIG. 5. In some examples, an update to an authentication application already installed in the IoT device 720 is sent to the IoT device 720 using the same method.

At step 712, the SM-SR server 737 reports the result of the profile change back to the requesting SM-DP server 735. At block 714, the SM-DP server 735 updates information about the profile installed in the IoT device 720. At step 716, the backend server 705 receives status of the installing of the authentication application from the SM-DP server 735. Although the example describes deploying the authentication application to end IoT device, the method may also be used to provision a frontend device, such as a reader device for a physical access system for example.

Figure 8:
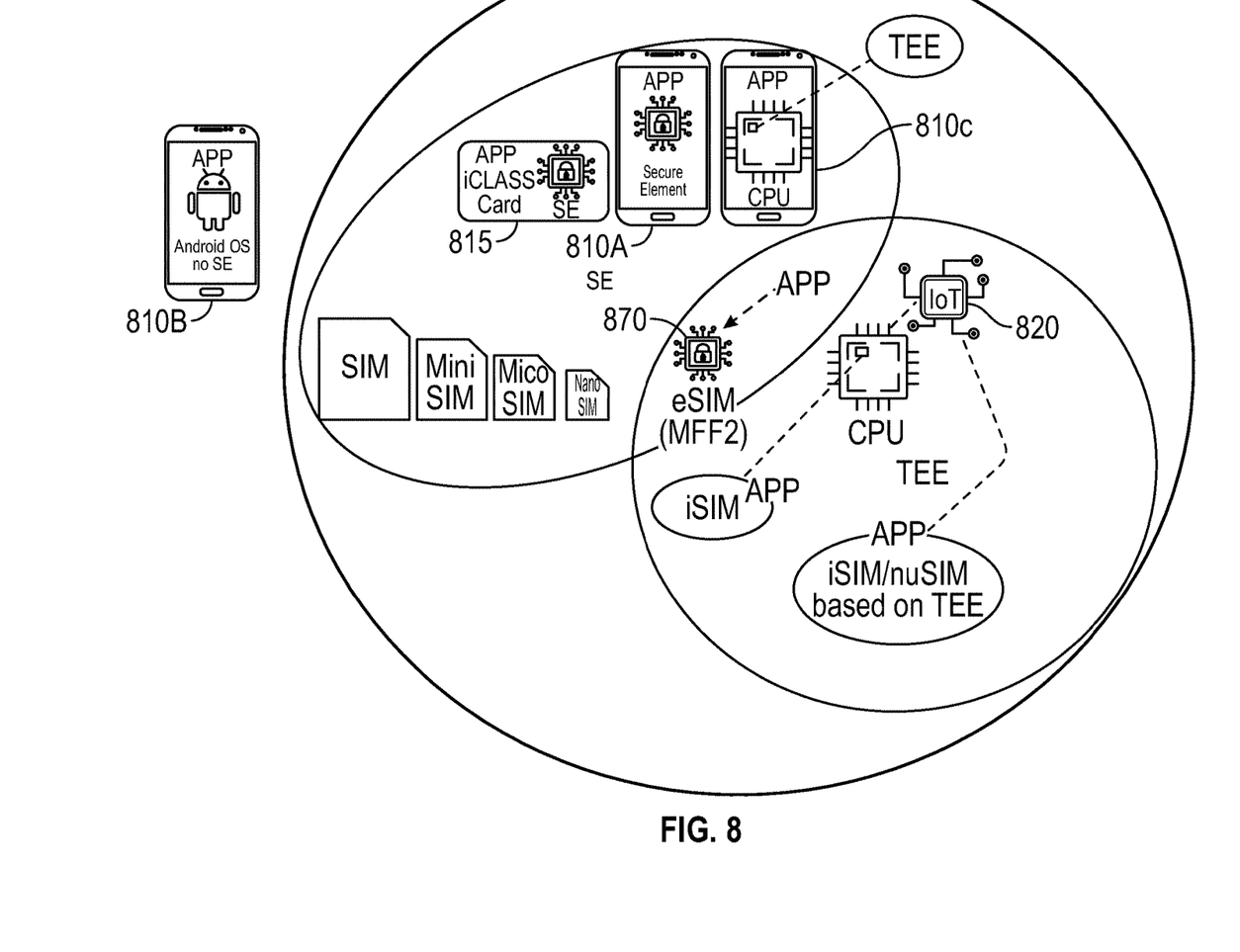
FIG. 8 is a block diagram showing different deployments of the authentication application in authentication devices.

FIG. 8 is a block diagram showing different deployments of the authentication application in authentication devices. The deployments include the authentication application (APP) installed in the SE of a credential device 815 that is a smart card, installed in the SE of a mobile device 810A, and installed in a mobile device 810B without an SE. The deployments can also include an embedded subscriber identity module (eSIM) 870 for a credential device, mobile device, or IoT device.

The deployment examples in FIG. 8 also include a trusted execution environment (TEE) of mobile device 810C and an IoT device 820. The deployment of the authentication application to the TEE can, if desired, leverage the eSIM deployment of the operator network to remotely deploy the authentication application to the TEE of end authentication devices. For example, the authentication application can be deployed using the SM-DP server of the operator network. The TEE may use Java Card technology similar to what is used in eSIM deployment.

The systems, devices, and methods described herein provide a secure over-the-air deployment channel between a provisioning backend server of an authentication system and the end authentication devices. This reduces cost of provisioning and maintenance of devices used in an authentication system.

Although the techniques described herein include provisioning the authentication application from a backend server and including the authentication application in an operator profile, other mechanisms can be used. For example, the eUICC of the user device may be pre-provisioned with the operator's remote SIM provisioning platform SM-DP address during manufacturing. When activated for the first time, the user device directly connects to the SM-DP to retrieve the profile that includes the authentication application. In another mechanism, the operator provides a QR code that is scanned with a smartphone to download the profile. The QR code contains information (e.g., the SM-DP address) that tells the user device where to retrieve the profile. The LPA of the user device may poll the SM-DP to retrieve the profile.

The methods, systems, and devices described herein provide a secure over the air channel to provision end devices to perform functions of authentication systems. This improves efficiency and reduces cost of provisioning devices used in an authentication system.

Figure 9:
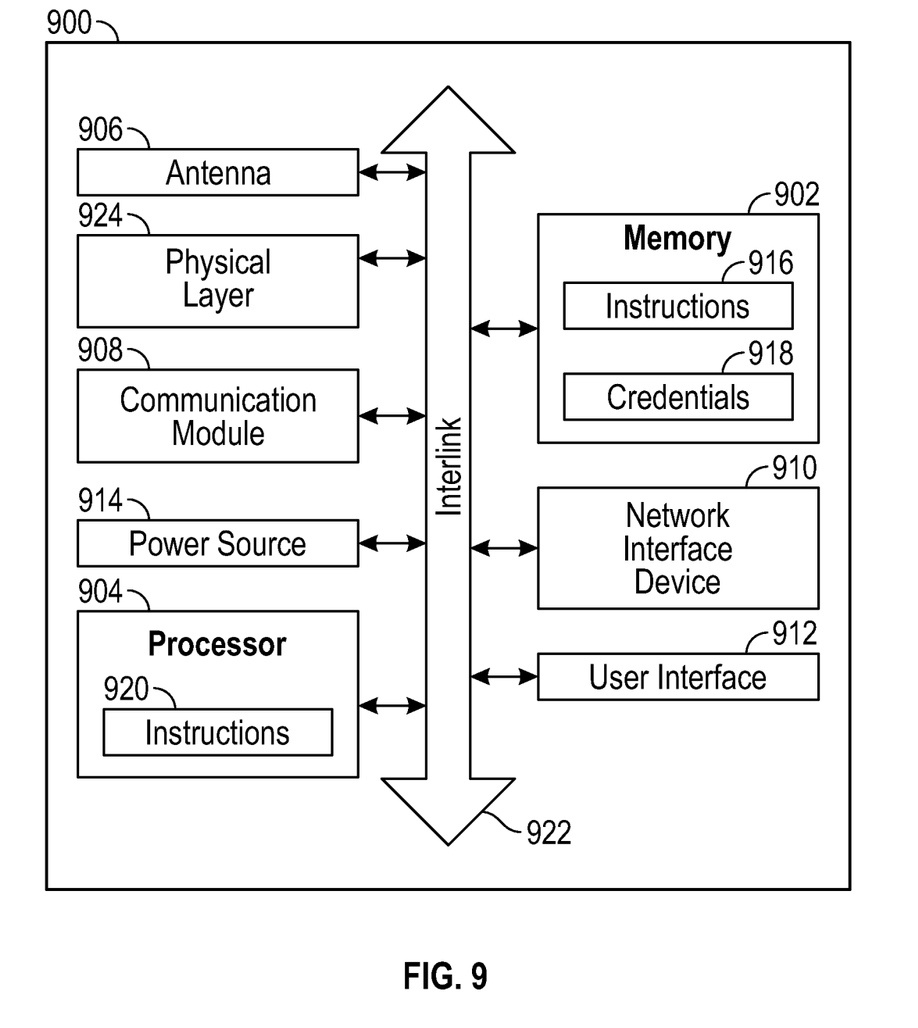
FIG. 9 is a block diagram schematic of portions of an example of an authentication device.

FIG. 9 is a block diagram schematic of various example components of a device 900 (e.g., an embedded device) for supporting the device architectures described and illustrated herein. The device 900 of FIG. 9 could be, for example, an authentication device (or other initiator device) that authenticates credential information of authority, status, rights, and/or entitlement to privileges for the holder of a credential device. The device could also be a credential device, such as a smart card, mobile phone, other portable computing device, a portable token, or other form factor.

With reference specifically to FIG. 9, additional examples of a device 900 for supporting the device architecture described and illustrated herein may generally include one or more of a memory 902, processing circuitry such as processor 904, one or more antennas 906, a communication port or communication module 908, a network interface device 910, a user interface 912, and a power source 914 or power supply.

Memory 902 can be used in connection with the execution of application programming or instructions by processing circuitry, and for the temporary or long-term storage of program instructions or instruction sets 916, such as instructions of an authentication application, and/or authorization data 918, such as credential data, credential authorization data, or access control data or instructions, as well as any data, data structures, and/or computer-executable instructions needed or desired to support the above-described device architecture. For example, memory 902 can contain executable instructions 916 that are used by a processor 904 of the processing circuitry to run other components of device 900, to calculate encryption keys to communicate credential or authorization data 918, and/or to perform any of the functions or operations described herein, such as the method of FIG. 3 for example. Memory 902 can comprise a computer readable medium that can be any medium that can contain, store, communicate, or transport data, program code, or instructions for use by or in connection with device 900. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processing circuitry of the device 900 is configured (e.g., by firmware) to perform the functions of verifier devices described herein, such as the functions of the method of FIG. 2 or FIG. 3 for example. The processing circuitry can correspond to one or more computer processing devices or resources. For instance, processor 904 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 904 can be provided as a microprocessor, Central Processing Unit (CPU), or plurality of microprocessors or CPUs that are configured to execute instructions sets stored in an internal memory 920 and/or memory 902. The processor can include a TEE for executing an authentication application.

Antenna 906 can correspond to one or multiple antennas and can be configured to provide for wireless communications between device 900 and another device. Antenna(s) 906 can be operatively coupled to physical layer circuitry comprising one or more physical (PHY) layers 924 to operate using one or more wireless communication protocols and operating frequencies including, but not limited to, the IEEE 802.15.1, Bluetooth®, Bluetooth® Low Energy (BLE), near field communications (NFC), ZigBee, GSM, CDMA, Wi-Fi, RF, UWB, and the like. In an example, antenna 906 may include one or more antennas coupled to one or more physical layers 924 to operate using ultra-wide band (UWB) for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the OOB activity/communication described herein.

Device 900 may additionally include a communication module 908 and/or network interface device 910. Communication module 908 can be configured to communicate according to any suitable communications protocol with one or more different systems or devices either remote or local to device 900. Network interface device 910 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 910 can include an Ethernet port or other physical jack, a Wi-Fi card, a Network Interface Card (NIC), a cellular interface (e.g., antenna, filters, and associated circuitry), or the like. In some examples, network interface device 910 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 906, communication module 908, and/or network interface device 910 or subcomponents thereof, may be integrated as a single module or device, function or operate as if they were a single module or device, or may comprise of elements that are shared between them.

User interface 912 can include one or more input devices and/or display devices. Examples of suitable user input devices that can be included in user interface 912 include, without limitation, one or more buttons, a keyboard, a mouse, a touch-sensitive surface, a stylus, a camera, a microphone, etc. Examples of suitable user output devices that can be included in user interface 912 include, without limitation, one or more LEDs, an LCD panel, a display screen, a touchscreen, one or more lights, a speaker, etc. It should be appreciated that user interface 912 can also include a combined user input and user output device, such as a touch-sensitive display or the like.

Power source 914 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 900.

Device 900 can also include one or more interlinks or buses 922 operable to transmit communications between the various hardware components of the device. A system bus 922 can be any of several types of commercially available bus structures or bus architectures.

ADDITIONAL DISCLOSURE AND EXAMPLES

Example 1 includes subject matter (such as a method of provisioning an authentication device of an authentication system) comprising sending an authentication application from an authentication system backend server to a backend network of a cellular network operator; verifying, by the backend network of the cellular operator, the authentication application and including the authentication application in an operator profile; sending the authentication application with the operator profile from the backend network of the cellular network operator to a local profile assistant (LPA) of the authentication device; and installing the authentication application in a secure zone of the authentication device using the LPA.

In Example 2, the subject matter of Example 1 optionally includes installing the authentication application after device authentication by subscription manager secure routing (SM-SR) server of the backend network of the cellular operator and the authentication device.

In Example 3, the subject matter of Example 2 optionally includes receiving status of the installing of the authentication application by the authentication system backend server from a subscription manager data preparation (SM-DP) server of the backend network of the cellular operator and the authentication device.

In Example 4, the subject matter of one or any combination of Examples 1-3 optionally includes credential device as the authentication device including a credential profile of the credential device in the operator profile; installing the authentication application and the credential profile in a secure element of the credential device; and an authentication application that includes instructions performable by processing circuitry of the credential device to provide credential information included in the credential profile to a verifier device of the authentication system.

In Example 5, the subject matter of Example 4 optionally includes a credential device that includes an embedded Universal Integrated Circuit Card (eUICC).

In Example 6, the subject matter of one or any combination of Examples 1-3 optionally includes a mobile computing device as the authentication device; installing the authentication application in a secure element of the mobile computing device; and an authentication application that includes instructions performable by processing circuitry of the mobile computing device to receive access credential information from a credential device and authenticate the credential device according to access credential information.

In Example 7, the subject matter of one or any combination of Examples 1-3 optionally includes a mobile computing device as the authentication device; installing the authentication application in a trusted execution environment (TEE) of the mobile computing device; and an authentication application that includes instructions performable by processing circuitry of the mobile computing device to receive access credential information from a credential device and authenticate the credential device according to access credential information.

In Example 8, the subject matter of one or any combination of Examples 1-3 optionally includes a mobile computing device as the authentication device; including a credential profile of the mobile computing device in the operator profile; installing the authentication application and the credential profile in a secure zone of the mobile computing device; and an authentication application that includes instructions performable by processing circuitry of the mobile computing device to provide credential information included in the credential profile to a verifier device of the authentication system.

In Example 9, the subject matter of one or any combination of Examples 1-3 optionally includes an Internet of Things (IoT) device as the authentication device; installing the authentication application in a trusted execution environment (TEE) of the IoT device; and an authentication application that includes instructions performable by processing circuitry of the IoT device to receive access credential information from another IoT device and authenticate the other IoT device according to access credential information.

In Example 10, the subject matter of one or any combination of Examples 1-3 optionally includes an Internet of Things (IoT) device as the authentication device; installing the authentication application and the credential profile in trusted execution environment (TEE) of the IoT device; and an authentication application that includes instructions performable by processing circuitry of the IoT device to provide credential information included in the credential profile to another IoT device of the authentication system.

Example 11 can include subject matter (such as an Internet of Things (IoT) device of an authentication system) or can optionally be combined with one or any combination of Examples 1-10 to include such subject matter, comprising physical layer circuitry and processing circuitry coupled to the physical layer circuitry. The processing circuitry includes a local profile assistant (LPA) application configured to authenticate subscription manager secure routing (SM-SR) server of a backend network of a cellular operator, receive an authentication application from the SM-SR server in response to the authentication, and install the authentication application in a trusted execution environment (TEE) of the IoT device.

In Example 12, the subject matter of Example 11 optionally includes an authentication application that includes instructions performable by processing circuitry of the IoT device to receive access credential information from another IoT device and authenticate the other IoT device according to access credential information.

In Example 13, the subject matter of one or both of Examples 11 and 12 optionally includes an LPA application configured to receive a credentialing profile from the SM-SR server, and install the authentication application and the credential profile in the TEE of the IoT device, and includes processing circuitry configured to to provide credential information included in the credential profile to another IoT device of the authentication system.

Example 14 includes subject matter (such as a mobile computing device of an authentication system) or can optionally be combined with one or any combination of Examples 1-13 to include such subject matter, comprising physical layer circuitry and processing circuitry coupled to the physical layer circuitry. The processing circuitry includes a local profile assistant (LPA) application configured to authenticate subscription manager secure routing (SM-SR) server of a backend network of a cellular operator, receive an authentication application from the SM-SR server in response to the authentication, and install the authentication application in a secure zone of the mobile computing device.

In Example 15, the subject matter of Example 14 optionally includes a secure zone is a secure element (SE) of the mobile computing device, and the authentication application includes instructions performable by processing circuitry of the mobile computing device to receive access credential information from a credential device and authenticate the credential device according to access credential information.

In Example 16, the subject matter of Example 14 optionally includes a secure zone is a trusted execution environment (TEE) of the mobile computing device, and the authentication application includes instructions performable by processing circuitry of the mobile computing device to receive access credential information from a credential device and authenticate the credential device according to access credential information.

In Example 17, the subject matter of one or any combination of Examples 14-16 optionally includes an LPA configured to receive a credential profile from the SM-SR server in response to the authentication, install the credential profile in the secure zone of the mobile computing device, and an authentication application that includes instructions performable by processing circuitry of the mobile computing device to provide credential information included in the credential profile to a verifier device of the authentication system.

Example 18 includes subject matter (such as a credential device of an authentication system) or can optionally be combined with one or any combination of Examples 1-17 to include such subject matter, comprising physical layer circuitry and processing circuitry coupled to the physical layer circuitry. The processing circuitry includes a local profile assistant (LPA) application configured to authenticate subscription manager secure routing (SM-SR) server of a backend network of a cellular operator; receive an authorization application and credential profile from the SM-SR server in response to the authentication; and install the authorization application and credential profile in a secure zone of the mobile computing device.

In Example 19, the subject matter of Example 18 optionally includes a secure zone is a secure element (SE) of the credential device; and an authentication application that includes instructions performable by processing circuitry of the credentialing device to provide credential information included in the credential profile to a verifier device of the authentication system.

In Example 20, the subject matter of Example 19 optionally includes an embedded Universal Integrated Circuit Card (eUICC).

In Example 21, the subject matter of one or any combination of Examples 18-20 optionally incudes a mobile computing device as the credential device.

In Example 22, the subject matter of Example 18 optionally includes a mobile computing device as the credential device, a secure zone that is a trusted execution environment (TEE) of the mobile computing device, and an authentication application that includes instructions performable by processing circuitry of the credentialing device to provide credential information included in the credential profile to a verifier device of the authentication system.

These non-limiting Examples can be combined in any permutation or combination. The above detailed description includes references to the accompanying drawings, which form a part of the detailed description. The drawings show, by way of illustration, specific embodiments in which the invention can be practiced. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of provisioning an authentication device of an authentication system, the method comprising:
    sending an authentication application from an authentication system backend server to a backend network of a cellular network operator;
    verifying, by the backend network of the cellular operator, the authentication application and including the authentication application in an operator profile;
    sending the authentication application with the operator profile from the backend network of the cellular network operator to a local profile assistant (LPA) of the authentication device; and
    installing the authentication application in a secure zone of the authentication device using the LPA after device authentication by a subscription manager secure routing (SM-SR) server of the backend network of the cellular operator, wherein the authentication application includes instructions that when performed by processing circuitry of the authentication device, causes the authentication device to function as a verifier device to authenticate identity of another device.

2. The method of claim 1, including receiving status of the installing of the authentication application by the authentication system backend server from a subscription manager data preparation (SM-DP) server of the backend network of the cellular operator and the authentication device.

3. The method of claim 1,
    wherein the authentication device is a mobile computing device;
    wherein installing the authentication application in the secure zone includes installing the authentication application in a secure element of the mobile computing device; and
    wherein the authentication application includes instructions performable by processing circuitry of the mobile computing device to receive access credential information from a credential device and authenticate the credential device according to access credential information.

4. The method of claim 1,
    wherein the authentication device is a mobile computing device;
    wherein installing the authentication application in the secure zone includes installing the authentication application in a trusted execution environment (TEE) of the mobile computing device; and wherein the authentication application includes instructions performable by processing circuitry of the mobile computing device to receive access credential information from a credential device and authenticate the credential device according to access credential information.

5. The method of claim 1,
wherein the authentication device is a mobile computing device, and the method further includes including a credential profile of the mobile computing device in the operator profile;
wherein installing the authentication application in the secure zone includes installing the authentication application and the credential profile in a secure zone of the mobile computing device; and
wherein the authentication application includes instructions performable by processing circuitry of the mobile computing device to provide credential information included in the credential profile to a verifier device of the authentication system.

6. The method of claim 1,
wherein the authentication device is an Internet of Things (IoT) device;
wherein installing the authentication application in the secure zone includes installing the authentication application in a trusted execution environment (TEE) of the IoT device; and
wherein the authentication application includes instructions performable by processing circuitry of the IoT device to receive access credential information from another IoT device and authenticate the other IoT device according to access credential information.

7. The method of claim 1,
wherein the authentication device is an Internet of Things (IoT) device, and the method further includes sending a credential profile to the IoT device;
wherein installing the authentication application in the secure zone includes installing the authentication application and the credential profile in trusted execution environment (TEE) of the IoT device; and
wherein the authentication application includes instructions performable by processing circuitry of the IoT device to provide credential information included in the credential profile to another IoT device of the authentication system.

8. An Internet of Things (IoT) device of an authentication system, the IoT device comprising:
physical layer circuitry; and
processing circuitry coupled to the physical layer circuitry, wherein the processing circuitry includes a local profile assistant (LPA) application configured to:
authenticate subscription manager secure routing (SM-SR) server of a backend network of a cellular operator;
receive an authentication application from the SM-SR server in response to the authentication; and
install the authentication application in a trusted execution environment (TEE) of the IoT device after device authentication by the SM-SR, wherein the authentication application includes instructions that when performed by processing circuitry of the IoT device, causes the IoT device to function as a verifier device to authenticate identity of another device.

9. The IoT device of claim 8, wherein the authentication application includes instructions performable by processing circuitry of the IoT device to receive access credential information from another IoT device and authenticate the other IoT device according to access credential information.

10. The IoT device of claim 8,
wherein the LPA application is configured to:
receive a credentialing profile from the SM-SR server; and
install the authentication application and the credential profile in the TEE of the IoT device; and
wherein the processing circuitry is configured to provide credential information included in the credential profile to another IoT device of the authentication system.

11. A mobile computing device of an authentication system, the mobile computing device comprising:
physical layer circuitry; and
processing circuitry coupled to the physical layer circuitry, wherein the processing circuitry includes a local profile assistant (LPA) application configured to:
authenticate subscription manager secure routing (SM-SR) server of a backend network of a cellular operator;
receive an authentication application from the SM-SR server in response to the authentication; and
install the authentication application in a secure zone of the mobile computing device, wherein the authentication application includes instructions that when performed by processing circuitry of the mobile computing device, causes the mobile computing device to function as a verifier device to authenticate identity of another device.

12. The mobile computing device of claim 11, wherein the secure zone is a secure element (SE) of the mobile computing device, and the authentication application includes instructions performable by processing circuitry of the mobile computing device to receive access credential information from a credential device and authenticate the credential device according to access credential information.

13. The mobile computing device of claim 11, wherein the secure zone is a trusted execution environment (TEE) of the mobile computing device, and the authentication application includes instructions performable by processing circuitry of the mobile computing device to receive access credential information from a credential device and authenticate the credential device according to access credential information.

14. The mobile computing device of claim 11, wherein the LPA is configured to:
receive a credential profile from the SM-SR server in response to the authentication;
install the credential profile in the secure zone of the mobile computing device; and
wherein the authentication application includes instructions performable by processing circuitry of the mobile computing device to provide credential information included in the credential profile to a verifier device of the authentication system.

* * * * *